Patented Mar. 14, 1944

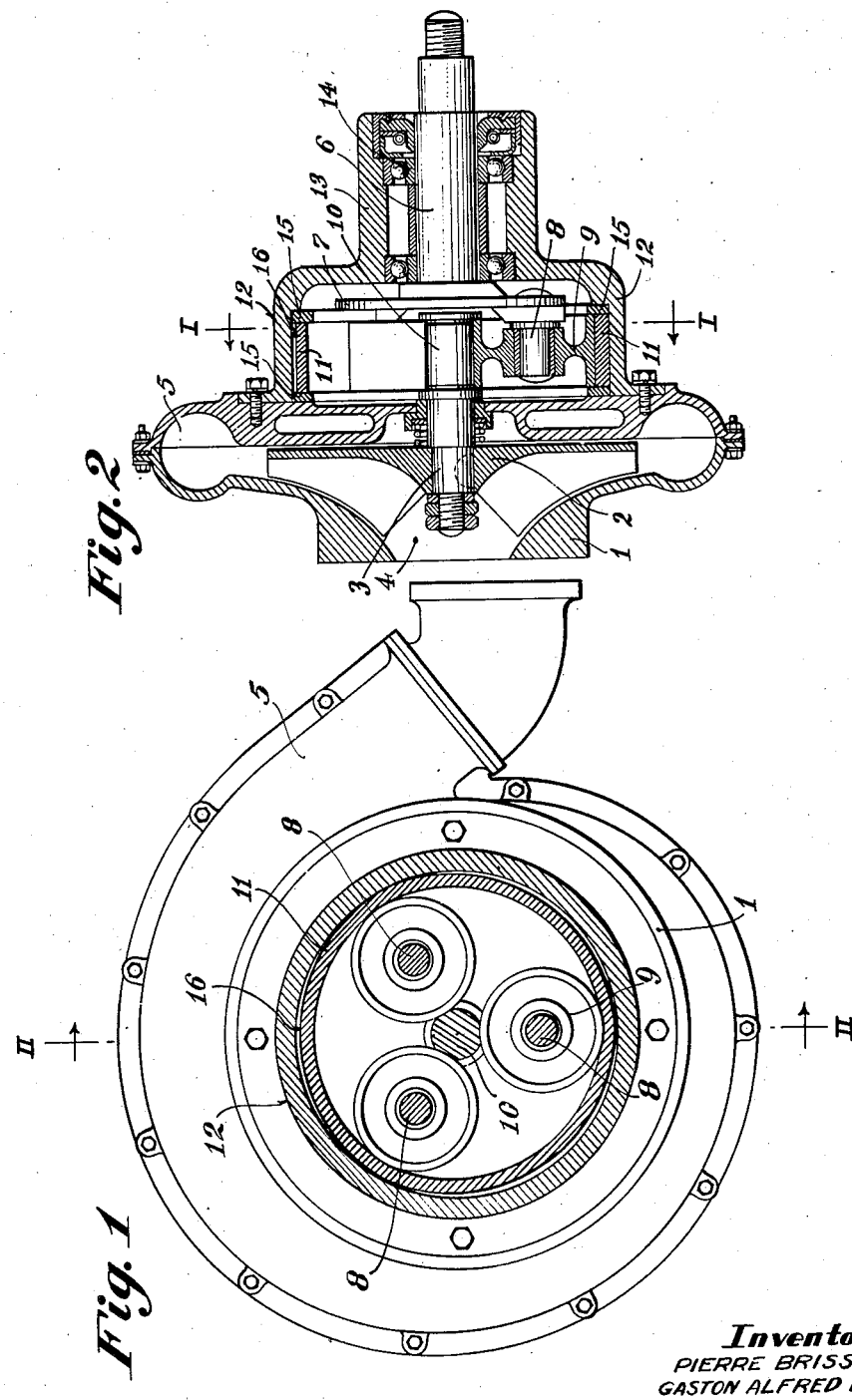

2,344,078

UNITED STATES PATENT OFFICE 2,344,078

TRANSMISSION

Pierre Brissonnet and Gaston Alfred Durand, Paris, France; vested in the Alien Property Custodian Application February 12, 1941, Serial No. 378,638
In Luxemburg May 23, 1939

1 Claim. (Cl. 74—302)

The present invention relates to sun-and-planet wheel transmissions in which the rolling elements consist of rollers and it is more especially, although not exclusively, concerned, among these transmissions, with those to be used in connection with supercharging compressors.

The object of the invention is to provide a transmission of this type which is better adapted to meet the requirements of practice than those used for the same purpose up to the present time.

According to a feature of the present invention, the rollers which constitute the planet wheels in transmissions of this type are applied against the central rotary element, or sun wheel, by means of a metal ring surrounding the set of planet wheels, said ring being elastically deformable in the radial direction and having an inner diameter which, before its mounting around the planet wheels, is slightly smaller than the diameter of the enveloping circle tangent outwardly to said set of planet wheels.

According to another feature of my invention, this metal ring is mounted in a rigid outer ring the inner radius of which is equal to the sum of the radius of said enveloping circle and of the radial thickness of the deformable metal ring.

Other features of the present invention will result from the following detailed description of some specific embodiments thereof.

A preferred embodiment of the present invention will be hereinafter described with reference to the accompanying drawing, given merely by way of example, and in which:

Fig. 1 is a transverse sectional view, on the line I—I of Fig. 2, of a supercharger compressor driven through a sun-and-planet wheel transmission made according to the present invention; and Fig. 2 is an axial sectional view, on the line II—II of Fig. 1, of this compressor, with its transmission.

In the example illustrated by the drawing, it is desired to transmit to the rotor of a supercharger compressor the movement of a rotating shaft with a multiplication of the speed of said shaft.

The compressor may be of any conventional or other type and, in particular, in the example shown, it comprises a stator 1, a wheel 2 carrying vanes or blades and forming the rotor, a shaft 3 for driving said rotor, an air inlet 4 and a delivery pipe 5.

In order to operate rotor 2, the movement of a shaft 6, driven directly or indirectly by the engine (not shown) supercharged by the compressor, is transmitted to shaft 3 through a planetary gear in which the elements in relative rolling movement are rollers. To this end, stub shafts 8 (for example, three in number) are mounted on a plate 7 rigid with shaft 6. Rollers 9 are mounted with a slight play on these stub shafts. In the central space between these rollers, we provide a shaft element 10 in line with the shaft 3 of the rotor and rigid therewith. The diameter of shaft element 10 and that of rollers 9 are such that the desired ratio of transmission is obtained. On the other hand the length of shaft element 10 in contact with rollers 9 is such that the friction developed between them when the rollers are pressed against the shaft ensures the drive. If necessary the contacting surfaces are roughened in order to increase the friction.

Rollers 9 are pressed against the driven shaft 10 by means of a metal ring 11 which bears against the inner surface of a rigid ring 12 integral with a fixed casing 13 mounted for example in a removable manner on the stator and in which the driving shaft 6 is advantageously journalled in ball bearings 14. Ring 11 is prevented from rotating and is held in axial position by means, for example, of rings 15 disposed on either side of ring 11 and wedged against the adjacent lateral surfaces of the crank case.

This metal ring 11 is elastically deformable in the radial direction and this is obtained not only by making it of a metal, for instance a special steel, having suitable elastic properties, but also by choosing suitable dimensions for its rectangular transverse section, the thickness of said ring corresponding substantially to the space existing between the external part of each roller and the internal surface of ring 12 in order to ensure a sufficient pressure for ensuring the drive. This rigid ring 12 is advantageously made of a metal such as aluminium having a coefficient of expansion different from that metal of which ring 11 is made.

The dimensions of ring 11 are so chosen that its inner diameter is slightly smaller (0.08 mm. of difference for instance for a diameter of 40 mm.) than that of the circle outwardly tangent to rollers 9 when the latter are in working position, applied against the shaft 10. Thus, ring 11, when fitted in position by being forced around rollers 9, is slightly deformed so that it remains in contact with the inner surface of rigid ring 12 only in the vicinity of the radii passing through the centers of the rollers, while between these points of contact there are spaces 16 of a thickness increasing gradually from said points of contact to the middle point between two adjacent rollers. These spaces are still further increased by the expansion of the elements of the transmission gear under the influence both of the temperature of the atmosphere in the vicinity of the engine and of the heat developed by the working of said engine. On the drawing the dimensions of these spaces 16 have been greatly exaggerated in order to make them more apparent.

The rollers are thus suitably pressed against the central rotatable element (shaft 10) of the gear by ring 11 while the contact between this ring and the outer ring 12 is limited to the advantageous points concerned, that is to say, around the bearing points of rollers 9. When the latter are driven by plate 7 in order to rotate shaft 10, ring 11 is continuously being deformed since the bearing points of the rollers move as the rollers roll upon the internal surface of the ring. The drive is thus obtained by the elastic tension of ring 11 while the latter is in limited contact with the outer ring 12, and not by the adjusted tightening of a nondeformable ring which would result, especially when the pieces undergo a certain expansion, in the jamming or rapid wear of rollers 9 and of ring 11.

As the inner diameter of ring 11 is slightly smaller than that of the circle outwardly tangent to the rollers, it is necessary to take certain precautions for its mounting. This mounting can be done without difficulty by first introducing shaft 6 and plate 7 into casing 13. Then the rollers are mounted on their stub shafts and ring 11 is inserted, if necessary after being slightly heated. As there exists a slight play between rollers 9 and their axles 8, these rollers tend to be pushed towards the centre, which facilitates the mounting of ring 11. Finally the end of shaft 10 is forced between the rollers, thus deforming ring 11 which, as shown by the drawing, ceases to be strictly circular.

This planetary transmission gear has many advantages and in particular that of working with a higher degree of efficiency and without noise and that of being quickly assembled and taken to pieces.

Of course the invention is not limited to the application and embodiment above referred to.

In a general manner, while we have, in the above description, disclosed what we deem to be practical and efficient embodiments of the present invention, it should be well understood that we do not wish to be limited thereto as there might be changes made in the arrangement, disposition and form of the parts as comprehended within the scope of the appended claim.

What we claim is:

In a transmission, the combination of a journal; a peripheral flange on one end of said journal; an annular seat on the end of said flange; a cylindrical wall extending from said flange at the outer periphery of said seat; a driving shaft mounted in the said journal; a disc mounted on the end of said shaft and having a plurality of stub shafts thereon; a roller loosely journaled on each stub shaft; a deformable ring adapted to be introduced between the rollers and the wall by displacing the rollers inwardly on the stub shafts; a closure plate bolted to the outer end of said wall and provided with a centrally disposed journal; a driven shaft mounted in said journal; a roller on the end of said driven shaft; a ring received on said seat between the deformable ring and the flange; and a second ring disposed between the deformable ring and the plate, the parts being so designed that when the plate is applied to the wall, the driving and driven shafts are aligned and the roller on the driven shaft, being introduced between the rollers on the stub shafts, displaces them outwardly to force them against the deformable ring, and the deformable ring is gripped between the other two rings by the drawing of the plate against the wall by the bolting operation.

PIERRE BRISSONNET.
GASTON ALFRED DURAND.